United States Patent
Muratov

(10) Patent No.: US 10,229,782 B2
(45) Date of Patent: Mar. 12, 2019

(54) WIRELESS POWER COIL WITH MULTI-LAYER SHIELD

(71) Applicant: MediaTek Inc., Hsin-Chu (TW)

(72) Inventor: Vladimir A. Muratov, Manchester, NH (US)

(73) Assignee: MediaTek Inc., Hsin-Chu (TW)

( * ) Notice: Subject to any disclaimer, the term of this patent is extended or adjusted under 35 U.S.C. 154(b) by 156 days.

(21) Appl. No.: 15/254,439

(22) Filed: Sep. 1, 2016

(65) Prior Publication Data

US 2017/0178800 A1 Jun. 22, 2017

Related U.S. Application Data

(60) Provisional application No. 62/270,065, filed on Dec. 21, 2015.

(51) Int. Cl.
| | | |
|---|---|---|
| *H01F 3/10* | (2006.01) | |
| *H04B 5/00* | (2006.01) | |
| *H01F 27/36* | (2006.01) | |
| *H01F 38/14* | (2006.01) | |

(52) U.S. Cl.
CPC ........... *H01F 27/365* (2013.01); *H01F 38/14* (2013.01); *H04B 5/0037* (2013.01); *H01F 2003/106* (2013.01)

(58) Field of Classification Search
CPC .. H02J 7/025; H02J 17/00; H02J 50/00; H02J 50/10; H02J 50/70; H01F 27/365; H01F 38/14; H01F 2003/106; H04B 5/0037
USPC .......................................... 307/104; 320/108
See application file for complete search history.

(56) References Cited

U.S. PATENT DOCUMENTS

| | | | | |
|---|---|---|---|---|
| 2010/0328044 | A1* | 12/2010 | Waffenschmidt | ....... H02J 7/025 340/10.4 |
| 2014/0177197 | A1 | 6/2014 | Lampinen | |
| 2014/0327394 | A1* | 11/2014 | Asselin | ..... H01F 3/10 320/108 |
| 2015/0115723 | A1 | 4/2015 | Levo et al. | |
| 2015/0123604 | A1* | 5/2015 | Lee | ......... H01F 38/14 320/108 |
| 2015/0325362 | A1 | 11/2015 | Kumura et al. | |

FOREIGN PATENT DOCUMENTS

| | | |
|---|---|---|
| DE | 10 2011 054 541 A1 | 4/2013 |
| WO | WO 2014/061082 A1 | 4/2014 |

OTHER PUBLICATIONS

European Search Report for Application No. 16205188.2-1556 dated May 15, 2017.

* cited by examiner

*Primary Examiner* — Hal Kaplan
(74) *Attorney, Agent, or Firm* — Wolf, Greenfield & Sacks, P.C.

(57) ABSTRACT

A wireless power assembly including a multi-layer magnetic shield is described. The wireless power assembly includes a wireless power coil and the multi-layer magnetic shield arranged adjacent to the wireless power coil. The magnetic shield includes a first layer comprising a first material and a second layer comprising a second material, wherein the second material has a higher permeability than the first material.

16 Claims, 5 Drawing Sheets

| # | Test | Ls Dielectric Substrate | Ls Conductive Substrate | Ls reduction | Q factor Dielectric Substrate | Q factor Conductive Substrate | Q factor reduction | Relative Height | Relative Cost |
|---|---|---|---|---|---|---|---|---|---|
| 1 | Ferrite shield | 24.60 | 23.08 | 6.2% | 165.7 | 53.1 | 67.9% | 1 | 1 |
| 2 | Ferrite shield & 3mm gap | 24.60 | 23.46 | 4.6% | 165.7 | 73.3 | 55.8% | 3 | 1 |
| 3 | Ferrite shield & 6mm gap | 24.60 | 24.13 | 1.9% | 165.7 | 95.9 | 42.1% | 6 | 1 |
| 4 | High-u 1 layer | 21.54 | 20.40 | 5.3% | 54.6 | 27.4 | 49.7% | 0.1 | 1.5 |
| 5 | High-u 2 layers | 23.18 | 22.29 | 3.9% | 76.7 | 42.2 | 45.0% | 0.2 | 3 |
| 6 | High-u 3 layers | 23.83 | 23.73 | 0.4% | 88.6 | 70.7 | 20.2% | 0.3 | 4.5 |
| 7 | High-u 4 layers | 24.12 | 23.97 | 0.6% | 100.4 | 78.0 | 22.3% | 0.4 | 6 |
| 8 | Ferrite + 1 layer high-u | 25.32 | 25.18 | 0.6% | 137.1 | 102.7 | 25.1% | 1.1 | 2.5 |
| 9 | Ferrite + 2 layers high-u | 25.56 | 25.56 | 0.0% | 143.4 | 119.8 | 16.4% | 1.2 | 4 |
| 10 | Ferrite + 3 layers high-u | 25.78 | 25.58 | 0.8% | 144.6 | 129.6 | 10.4% | 1.3 | 5.5 |
| 11 | Ferrite + 4 layers high-u | 25.71 | 25.63 | 0.3% | 146.8 | 135.3 | 7.8% | 1.4 | 7 |

FIG. 5

WIRELESS POWER COIL WITH MULTI-LAYER SHIELD

CROSS REFERENCE TO RELATED APPLICATIONS

This application claims priority to U.S. Provisional Application Ser. No. 62/270,065, titled "Wireless Power Coil Assembly," filed Dec. 21, 2015, which is hereby incorporated by reference in its entirety.

BACKGROUND

A wireless power system employs a pair of inductive coils forming a loosely-coupled transformer to transfer power wirelessly. The pair of inductive coils includes a transmit coil formed, for example, as a portion of a charging pad, and a receive coil integrated with an electronic device such as a mobile phone, smartphone, or other computing device. Power transferred to the receive coil may be used by the electronic device to, for example, charge a battery of the electronic device.

FIG. 1 illustrates a wireless power system that includes a wireless power transmitter 2 and a wireless power receiver 3. The wireless power transmitter 2 receives a fixed voltage from a DC adapter. The fixed adapter voltage is scaled by a DC/DC converter 4 and applied to an inverter 6. The inverter, in conjunction with transmitter matching network 8, generates an AC current in transmit coil 10. The AC current in the transmit coil 10 generates an oscillating magnetic field in accordance with Ampere's law. The oscillating magnetic field induces an AC voltage into the tuned receive coil 12 of wireless power receiver 3 in accordance with Faraday's law. The AC voltage induced in the receive coil 12 is applied to a rectifier 16 that generates an unregulated DC voltage. The unregulated DC voltage is regulated using a DC/DC converter 18, which is filtered and provided to a load, such as a battery charger of an electronic device.

SUMMARY

Some embodiments are directed to a wireless power receiver. The wireless power receiver comprises a receive coil configured to generate an AC voltage in the presence of a magnetic field; a conductive substrate arranged adjacent to the receive coil; and a magnetic shield arranged between the receive coil and the conductive substrate, wherein the magnetic shield includes a first layer comprising a first material and a second layer comprising a second material, wherein the second material has a higher permeability than the first material.

Some embodiments are directed to a wireless power assembly. The wireless power assembly includes a wireless power coil; and a magnetic shield arranged adjacent to the wireless power coil, wherein the magnetic shield includes a first layer comprising a first material and a second layer comprising a second material, wherein the second material has a higher permeability than the first material.

Some embodiments are directed to an electronic device. The electronic device comprises a receive coil configured to generate an AC voltage in the presence of a magnetic field; a battery arranged adjacent to the receive coil; and a magnetic shield arranged between the receive coil and the battery, wherein the magnetic shield includes a first layer comprising a first material and a second layer comprising a second material, wherein the second material has a higher permeability than the first material.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 shows a table of experimental results obtained using a multi-layer shield in accordance with some embodiments.

DETAILED DESCRIPTION

In a wireless power system, power transfer between the transmitting coil and the receive coil is lossy due in part to stray magnetic flux that is not captured by the receive coil. The efficiency ($\eta$) of the wireless power system is directly related to the quality factor (Q) of the coils in accordance with the following expression:

$$\eta = \frac{k^2 Q_1 Q_2}{\left(1 + \sqrt{1 + k^2 Q_1 Q_2}\right)^2},$$

where $Q_1$ is the Q of the transmit coil, $Q_2$ is the Q of the receive coil, and k is a coupling coefficient between the coils. Because coils in a wireless power system are not perfectly coupled (i.e., k<1), some of the magnetic field not captured by the coils is lost as stray magnetic flux, thereby reducing the efficiency of the system. As discussed in more detail below, stray magnetic flux may also induce eddy currents in a conductive substrate located near the coil(s), which leads to undesirable effects.

Whether intentional or not, one or both of the coils of a wireless power system may be arranged adjacent to a conductive substrate such that at least a portion of the magnetic field generated/sensed by the coil(s) is trapped by the conductive substrate as eddy currents flowing in the conductive substrate during operation. As used herein, the term "adjacent" refers to a spatial proximity of a first component near, but not necessarily connected with another component. For example, two components separated by a small gap may still be considered "adjacent" as that term is used herein, even though the two components are not in physical contact with each other.

In an electronic device such as a smartphone that includes a wireless charging capability, the receive coil configured to generate a current in response to a magnetic field may be arranged adjacent to the battery of the device to provide battery charging. Batteries for electronic devices are often made of highly-conductive materials such as aluminum, which trap stray magnetic flux not captured by the receive coil as eddy currents. As another example, a wireless power transmit coil integrated into a workbench or a vehicle may be located near one or more conductive substrates, and stray magnetic flux may be trapped within the adjacent conductive substrate(s). When one or both of the coils in a wireless power system is arranged near a conductive substrate, the efficiency of the wireless power system is reduced due to a reduction of the Q of the coil arranged near the conductive substrate. For example, stray magnetic flux trapped in eddy currents formed within the conductive substrate, does not form a portion of a return path to the transmit coil, thereby reducing the Q of the coil. Stray magnetic flux trapped in eddy currents formed within a conductive substrate may also result in undesirable effects other than reducing the efficiency of the wireless power system including, but not limited to, heating of the conductive substrate.

Figure 1:
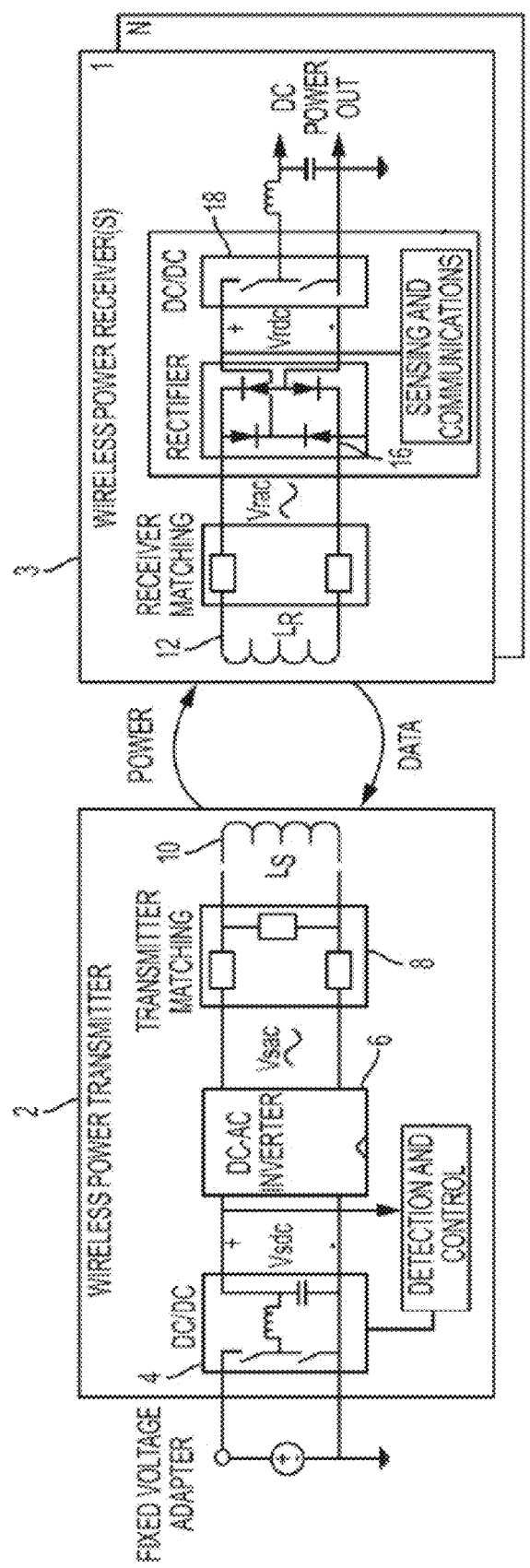
FIG. 1 schematically shows a wireless power system within which a multi-layer shield may be implemented in accordance with some embodiments.
Figure 2:
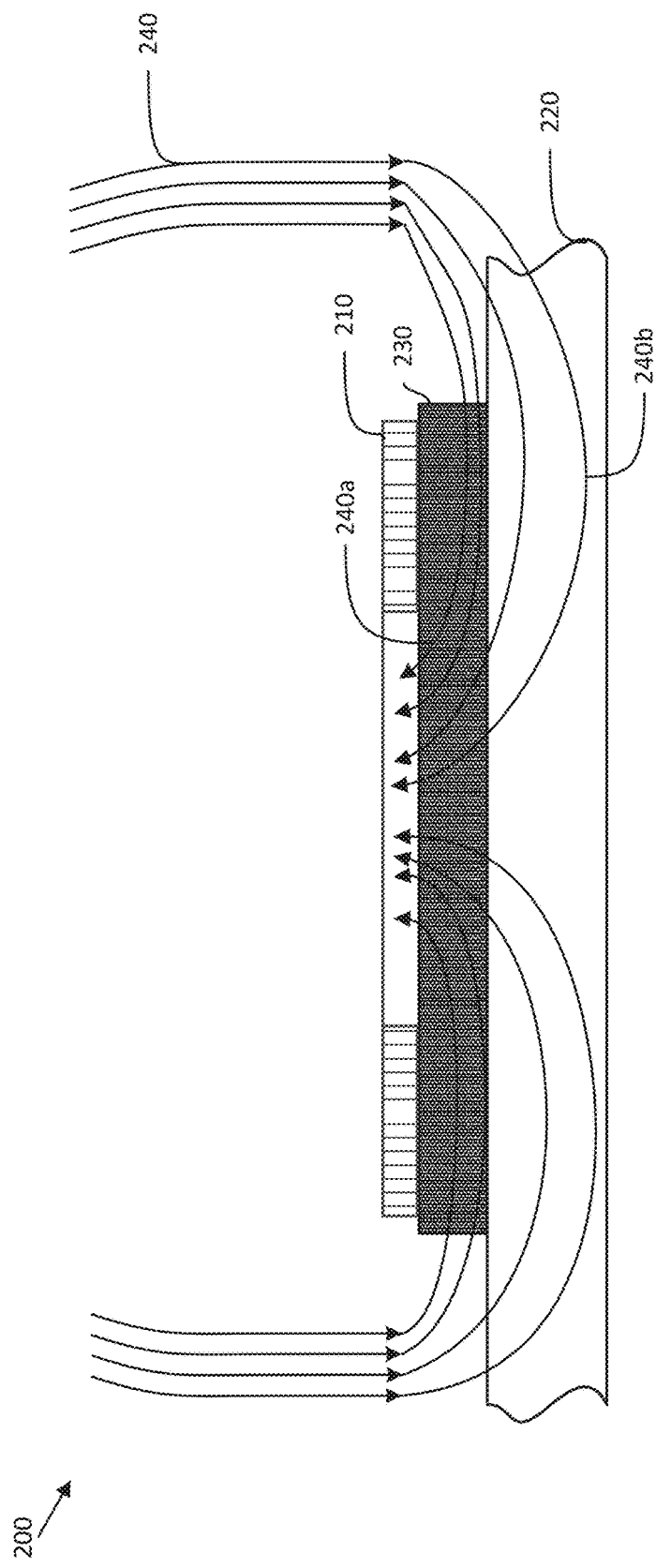
FIG. 2 shows a schematic of a wireless power receiver that includes a single-layer shield for trapping stray magnetic flux.

Some wireless power systems attempt to reduce the effect of stray magnetic flux on conductive substrates located near a wireless power coil by incorporating a magnetic shielding layer arranged between the coil and the conductive substrate. FIG. 2 schematically illustrates a wireless power assembly 200 that may be included as a portion of an electronic device such as a smartphone or tablet computer. The wireless power assembly 200 includes a receive coil 210 configured for use in a wireless power system such as a wireless charging system to charge a battery of an electronic device. Wireless power assembly 200 also includes a magnetic shield 230 formed between receive coil 210 and conductive substrate 220.

During operation of the wireless power system, magnetic shield 230 captures at least some stray magnetic flux to reduce undesirable effects of the stray flux on conductive substrate 220. FIG. 2 illustrates magnetic flux 240 of an oscillating magnetic field generated by a transmit coil in a wireless power system and sensed by receive coil 210. As shown, magnetic flux 240 includes flux 240a that is captured at least partially by magnetic shield 230 and flux 240b that is not captured by magnetic shield 230, thereby reducing the efficiency of the wireless power transfer system. Some embodiments, described in more detail below are directed to multi-layer magnetic shields that capture more flux than some conventional single-layer magnetic shields.

Permeability ($\mu$) is a measure of the ability of a material to support the formation of a magnetic field in the material. In a wireless power system, the medium between the transmit coil and the receive coil is generally free-space (air) having a permeability $\mu=\mu_o$. When magnetic shield 230 includes a material with a relative permeability greater than $\mu_o$ (i.e., $\mu>\mu_o$), the shield functions to trap stray magnetic flux in a low reluctance path. For example, magnetic shield 230 may comprise a low-loss material such as ferrite, which has a relative permeability in the range of 200-2000. Although ferrite is a frequently-used material for magnetic shielding due to its low-loss characteristics, other materials including, but not limited to mu-metals may alternatively be used.

The magnitude of the magnetic field falls off with distance from receive coil 210. Accordingly, some techniques for capturing more stray magnetic flux include increasing the thickness of the magnetic shield 230 to provide a larger low-reluctance return path for the flux and/or increasing the distance between the receive coil 210 and the conductive substrate 220 by, for example, introducing a gap between the coil 210 and the conductive substrate 220. In practice, manufacturers of electronic devices such as smartphones and tablet computers often employ thickness design constraints that preclude the use of thick magnetic shielding structures or gaps.

Figure 3:
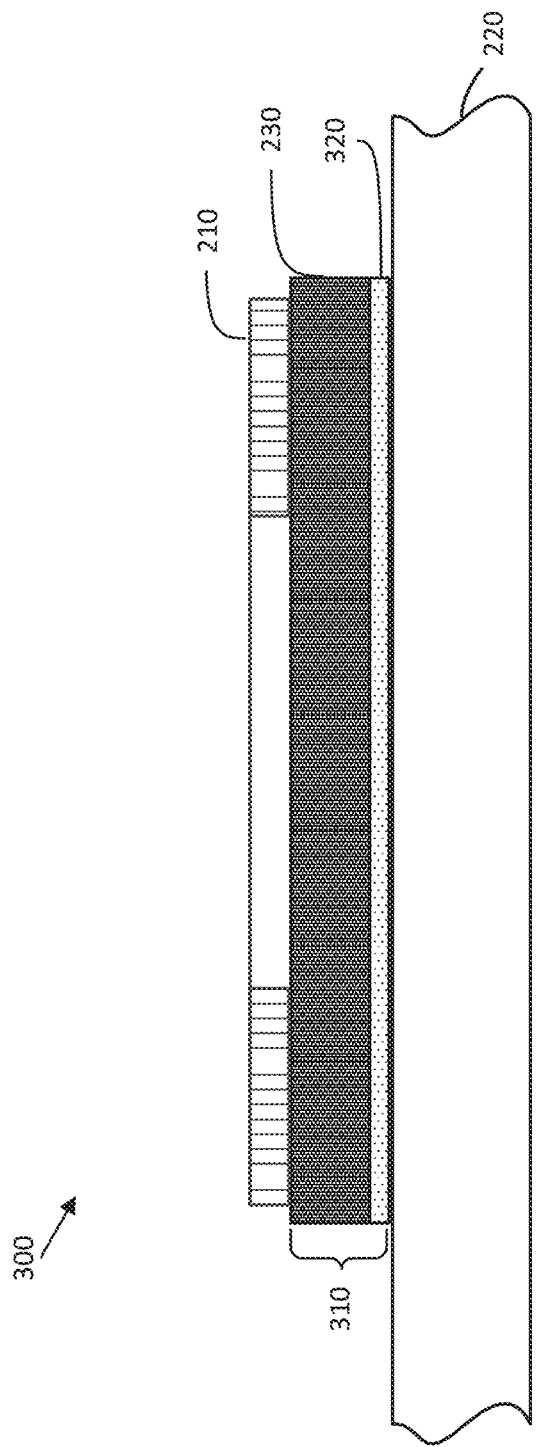
FIG. 3 shows a schematic of a wireless power receiver that includes a multi-layer shield for trapping stray magnetic flux in accordance with some embodiments.

The inventor has recognized and appreciated that single-layer magnetic shields used in some conventional wireless power systems may be improved by using a multi-layer magnetic shield, where at least some of the layers in the multi-layer magnetic shield have different magnetic properties. FIG. 3 schematically illustrates a wireless power assembly 300 that includes a multi-layer magnetic shield 310 in accordance with some embodiments. Multi-layer magnetic shield 310 is arranged between receive coil 210 and conductive substrate 220. Magnetic shield 310 includes a first layer 230 and a second layer 320. In some embodiments, the first layer 230 may comprise a low-loss material such as ferrite, which has a relative permeability in the range of 200-6000. Non-limiting examples of a low-loss material included in the first layer 230 include, but are not limited to, EPCOS N30 or N48, Ferroxcube 3H3 or 3E4, and TDK H5A or H6K. The second layer 320 may comprise a material having a relative permeability larger than the material in the first layer 230. Non-limiting examples of a material included in second layer 320 include, but are not limited to, laminated thin and flexible material Vitroperm® 800 R that has relative permeability higher than 12000, nanocrystalline foil made of FT-3 W Metglas® material, and Metglas® 2605S3A magnetic alloy sheets.

In some embodiments, the second layer 320 may include material characterized as "high-loss" in that the material exhibits magnetic losses greater than the material in first layer 230. As discussed above, relatively low-loss materials such as ferrite are often used for magnetic shielding in wireless power systems because of the ability of such materials to effectively capture stray magnetic flux. Contrary to expectations, the inventor has recognized that a magnetic shield that includes both low-loss and high-loss materials may be useful in improving the efficiency of a wireless power system provided that the higher-loss materials are arranged in a configuration within the magnetic shield to capture stray magnetic flux where the magnitude of the magnetic field is weaker.

Although higher-loss materials are generally not as efficient at capturing stray magnetic flux as low-loss materials (e.g., ferrite) in large magnetic fields, higher-loss materials are substantially more efficient at capturing stray magnetic flux than lower-loss materials when the magnetic field is weak. As discussed above, the strength of the magnetic field decreases as the distance from the receive coil 210 is increased. Rather than merely increasing the thickness of the low-loss material in the magnetic shield or adding a gap to increase the distance between the conductive substrate 220 and the receive coil 210, the inventor has recognized that the efficiency of the wireless power system may be improved by arranging a higher-loss, high relative permeability material in a location where the magnetic field strength is weak. The high relative permeability material effectively captures stray magnetic flux in the weak magnetic field providing a return path for the flux that increases the Q of the coil.

Some embodiments include a multi-layer magnetic shield having layers arranged such that the efficiency of capturing stray magnetic flux in each layer is related to the magnetic properties of the material in that layer and the distance of the layer from the receive coil 210. In particular, as shown in FIG. 3, some embodiments include a first magnetic shielding layer 230 of low-loss, low relative permeability material arranged immediately adjacent to the receive coil 210, where the magnetic field is the strongest, and a second magnetic shielding layer 320 of higher-loss, high relative permeability material arranged between the first magnetic shielding layer 230 and the conductive substrate 220, where the magnetic field is weaker. By arranging the layers of the magnetic shield 310 in a way that each layer efficiently captures stray magnetic flux based on the magnetic characteristics of the material in the layer, the quality factor of the receive coil 210 is improved, thereby improving the overall efficiency of the wireless power system.

The thickness of the layers in the multi-layer magnetic shield 310 may be different. In some embodiments, the first layer 230 has a thickness larger than the thickness of the second layer 320. For example, in some embodiments, the first layer 230 has a thickness of 1 mm and the second layer 320 has a thickness equal to or less than 0.2 mm. In some embodiments, the second layer 320 has a thickness of 0.1 mm. In yet other embodiments, the second layer 320 has a thickness less than 0.1 mm when the layer includes a material with a very high permeability ($\mu \gg \mu_0$). Other thicknesses may alternatively be used, and embodiments are not limited in this respect.

Figure 4:
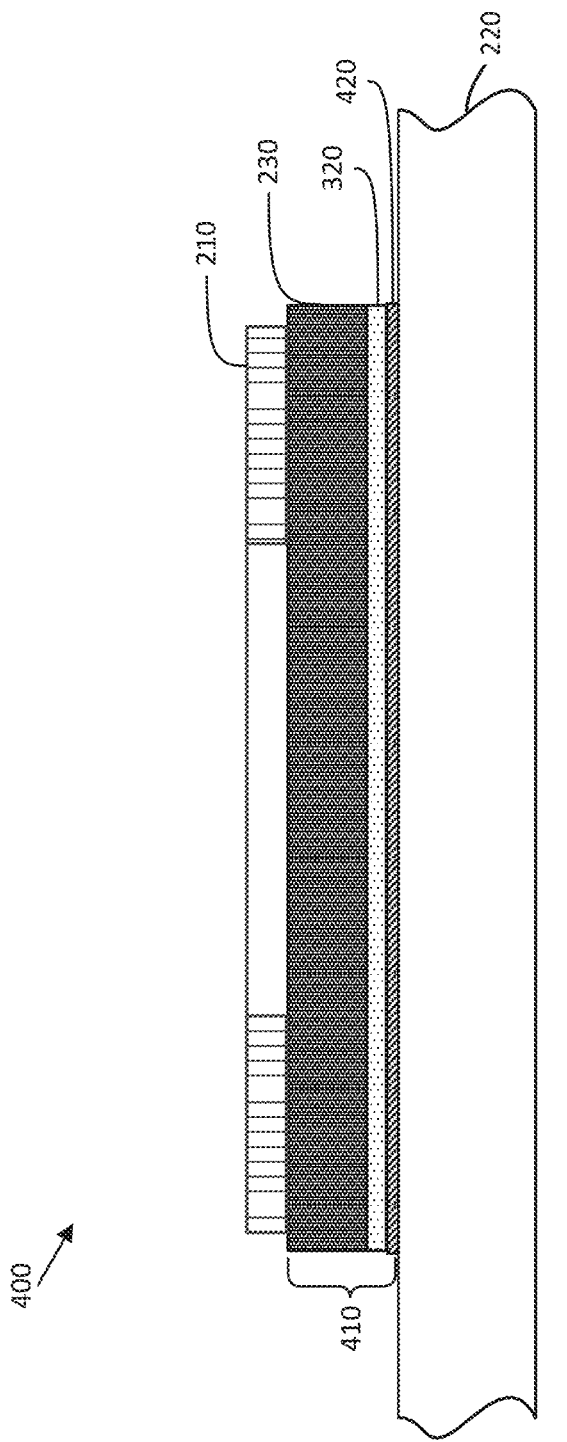
FIG. 4 shows a schematic of a wireless power receiver that includes an alternate multi-layer shield for trapping stray magnetic flux in accordance with some embodiments.

In some embodiments, a multi-layer magnetic shield may include more than two layers. FIG. 4 illustrates an example of a wireless power assembly 400 including a magnetic shield 410 having three layers, each of which comprises a material having different magnetic properties. As shown, magnetic shield 410 includes a first layer 230, a second layer 320, and a third layer 420 arranged between receive coil 210 and conductive substrate 220. The first layer 230 and the second layer 320 may include materials having magnetic properties similar to those described for the layers of magnetic shield 310 described in connection with FIG. 3. The additional third layer 420 may include a material with a higher permeability than both the material in second layer 320 and the material in first layer 230. The thickness of third layer 420 may be the same or less than the thickness of second layer 320. Although only three layers are shown in magnetic shield 410, it should be appreciated that any suitable number of layers may be used, and embodiments are not limited in this respect.

FIG. 5 is a table of experimental results that demonstrate the effectiveness of a multi-layer magnetic shield, designed in accordance with some embodiments, to improve the quality factor (Q factor) of a wireless power coil. The Q factor of a coil is defined by the ratio of the inductance (L) to the resistance (R) of the coil as $$Q = \frac{\omega L}{R},$$

where $\omega = 2\pi f$. In addition to the Q factor of the coil, the inductance (Ls) of the coil is shown for different wireless power assembly configurations. All measurements were made with a resonant frequency (f) of 100 kHz.

For reference, a wireless power assembly was constructed to include a wireless power coil arranged adjacent to a 1 mm single-layer ferrite shield (test 1). The height and estimated cost for all other wireless power assembly configurations shown in FIG. 5 (i.e., configurations for tests 2-11) relative to the configuration for test 1 are also shown in the rightmost two columns of FIG. 5. As shown, when the single-layer ferrite shield was formed on a dielectric substrate the Q factor of the coil in this arrangement was 165.7, and when the single-layer ferrite shield was formed on a conductive substrate, a reduction in the Q factor of the coil of about 68% was observed.

In tests 2 and 3, a gap was introduced between the shield and the conductive substrate. As shown, the presence of the gap resulted in improvements to the Q factor of the coil when the shield was formed on a conductive substrate, with a Q factor of 95.9 observed when a 6 mm gap was used. Although introducing a gap resulted in an improved coil Q factor, the height of the wireless power assembly in such configurations is considerably increased, which may not be suitable for some design constraint requirements of portable electronic devices.

In tests 4-7, the single-layer ferrite shield of tests 1-3 was replaced with a shield including a thin layer of high relative permeability (high $\mu$) material. Compared to the single-layer ferrite shield with no gap configuration (test 1) the Q factor of the coil was improved between 18-25% when a 0.3 mm (test 6) or 0.4 mm (test 7) thickness of high $\mu$ material was formed adjacent to a conductive substrate. Because the cost of a 0.1 mm layer of high $\mu$ material was estimated at 1.5 times the cost of a 1 mm layer of ferrite shield material, the estimated relative cost of the configurations in tests 6 and 7 is 4.5-6 times higher than for the single-layer ferrite shield (test 1), as shown.

In tests 8-11, the single-layer ferrite shield of tests 1-3 was replaced with a multi-layer "hybrid" shield that included a 1 mm ferrite layer and a thinner layer of high $\mu$ material. In these configurations, the Q factor of the coil was improved to a value over 100 without a substantial increase in height. For example, in the configuration used in test 8 (1 mm ferrite+0.1 mm high $\mu$ material shield), the Q factor of the coil was 102.7 with an increase in height of only 0.1 mm compared to the test 1 configuration. Introduction of the thin layer of high relative permeability material in the test 8 configuration increased the Q factor of the coil to approximately 62% of the baseline Q factor determined for the configuration used in test 1. Increasing the thickness of the high $\mu$ material beyond 0.1 mm in tests 9-11 resulted in further improvements to the Q factor of the coil, with the configuration used in test 11 (1 mm ferrite+0.4 mm high $\mu$ material shield) demonstrating a Q factor of greater than 80% of the baseline Q factor determined for the test 1 configuration.

As can be appreciated from the experimental results shown in FIG. 5, use of a multi-layer magnetic shield in a wireless power assembly provides efficiency gains in the wireless power system by increasing the Q factor of the coil. Compared with a single-layer ferrite magnetic shield, the multi-layer magnetic shields designed in accordance with some embodiments trap and return more stray magnetic flux to improve the overall efficiency of the wireless power system without requiring substantially thicker shields or gaps between components. Such a multi-layer magnetic shield design enables a thin device profile more likely to satisfy manufacturer specifications for electronic devices.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A wireless power receiver, comprising:
    a receive coil configured to generate an AC voltage in the presence of a magnetic field;
    a conductive substrate arranged adjacent to the receive coil such that at least some magnetic flux associated with the magnetic field is trapped by the conductive substrate; and
    a magnetic shield comprising:
        a first layer arranged between the receive coil and the conductive substrate and comprising a first material; and
        a second layer arranged between the receive coil and the conductive substrate and comprising a second material,
        wherein the second material has a higher permeability than the first material, wherein the second layer has a thickness that is less than a thickness of the first layer, and wherein the second layer is arranged between the first layer and the conductive substrate.

2. The wireless power receiver of claim 1, wherein the magnetic shield further includes a third layer comprising a third material, wherein the third material has a higher permeability than the second material.

3. The wireless power receiver of claim 2, wherein the third layer is arranged between the second layer and the conductive substrate.

4. The wireless power receiver of claim 1, wherein the first material comprises ferrite and the second material comprises a material selected from the group consisting of a nanocrystalline foil and a magnetic alloy sheet.

5. The wireless power receiver of claim 1, wherein a thickness of the second layer is 0.4 mm or less.

6. The wireless power receiver of claim 5, wherein the thickness of the second layer is 0.1 mm.

7. The wireless power receiver of claim 1, wherein the receive coil, the magnetic shield, and the conductive substrate are arranged consecutively without intervening gaps.

8. A wireless power assembly, comprising:
    a wireless power coil; and
    a magnetic shield arranged adjacent to the wireless power coil such that when the wireless coil is in the presence of a magnetic field, the magnetic shield captures at least some stray magnetic flux not captured by the wireless power coil, wherein the magnetic shield includes a first layer comprising a first material and a second layer comprising a second material, wherein the second material has a higher permeability than the first material, wherein each of the first layer and second layer are arranged between the wireless power coil and a conductive substrate, wherein the second layer has a thickness that is less than a thickness of the first layer, and wherein the second layer is arranged between the first layer and the conductive substrate.

9. The wireless power assembly of claim 8, wherein the wireless power coil is a receive coil configured to generate an AC voltage in the presence of the magnetic field.

10. The wireless power assembly of claim 8, wherein the wireless power coil is characterized by a first quality factor value in the absence of the conductive substrate arranged adjacent to the wireless power coil such that at least some of the stray magnetic flux associated with the magnetic field is trapped by the conductive substrate and is characterized by a second quality factor value in the presence of the conductive substrate arranged adjacent to the wireless power coil, wherein the second quality factor value is at least 60% of the first quality factor value.

11. The wireless power assembly of claim 10, wherein the second quality factor value is at least 75% of the first quality factor value.

12. An electronic device, comprising:
    a receive coil configured to generate an AC voltage in the presence of a magnetic field;
    a battery arranged adjacent to the receive coil such that at least some magnetic flux associated with the magnetic field is trapped by the battery; and
    a magnetic shield comprising:
        a first layer arranged between the receive coil and the battery and comprising a first material; and
        a second layer arranged between the receive coil and the battery and comprising a second material,
        wherein the second material has a higher permeability than the first material, wherein the second layer has a thickness that is less than a thickness of the first layer, and wherein the second layer is arranged between the first layer and the battery.

13. The electronic device of claim 12, wherein the magnetic shield further includes a third layer comprising a third material, wherein the third material has a higher permeability than the second material.

14. The electronic device of claim 13, wherein the third layer is arranged between the second layer and the battery.

15. The electronic device of claim 12, wherein a thickness of the second layer is 0.4 mm or less.

16. The electronic device of claim 12, wherein the thickness of the second layer is 0.1 mm.

* * * * *